United States Patent
Varga (10) Patent No.: US 7,869,971 B2
(45) Date of Patent: Jan. 11, 2011

(54) SAFETY VALVE TESTING

(75) Inventor: Otto Herman Varga, Bristol (GB)

(73) Assignee: Seetru Limited (GB)

( * ) Notice: Subject to any disclaimer, the term of this patent is extended or adjusted under 35 U.S.C. 154(b) by 185 days.

(21) Appl. No.: 11/885,462

(22) PCT Filed: Jan. 20, 2006

(86) PCT No.: PCT/GB2006/000205

§ 371 (c)(1),
(2), (4) Date: Jun. 23, 2008

(87) PCT Pub. No.: WO2006/092548

PCT Pub. Date: Sep. 8, 2006

(65) Prior Publication Data

US 2009/0024258 A1    Jan. 22, 2009

(30) Foreign Application Priority Data

| Mar. 4, 2005 | (GB) | 0504491.2 |
| May 27, 2005 | (GB) | 0510860.0 |
| Jun. 30, 2005 | (GB) | 0513374.9 |
| Aug. 5, 2005 | (GB) | 0516076.7 |
| Nov. 1, 2005 | (GB) | 0522291.4 |
| Nov. 4, 2005 | (GB) | 0522508.1 |
| Nov. 8, 2005 | (GB) | 0522790.5 |
| Nov. 18, 2005 | (GB) | 0523480.2 |

(51) Int. Cl.
*G01M 3/28* (2006.01)

(52) U.S. Cl. .......... 702/98; 702/33; 702/34; 702/35; 702/113; 73/9; 73/168; 73/40.5 R (58) Field of Classification Search .......... 702/33–35, 702/98, 113; 73/168
See application file for complete search history.

(56) References Cited

U.S. PATENT DOCUMENTS

| 4,349,885 A | 9/1982 | Thompson |
| 4,557,136 A * | 12/1985 | Greenhalf .............. 73/1.72 |
| 4,566,310 A | 1/1986 | Cohen et al. |
| 6,283,138 B1 * | 9/2001 | Friend et al. .......... 137/14 |
| 2001/0029933 A1* | 10/2001 | Fabre ................. 123/520 |
| 2002/0029808 A1 | 3/2002 | Friend et al. .......... 137/551 |

FOREIGN PATENT DOCUMENTS

| DE | 3703535 A1 | 8/1988 |
| DE | 19949733 B4 | 1/2004 |
| GB | 1539922 A | 5/1976 |
| GB | 2303902 A | 5/1997 |
| GB | 2360078 A | 9/2001 |

OTHER PUBLICATIONS

"Patent Acts 1977: Search Report under Section 17(5)" Sep. 26, 2005 for Application No. GB0510860.0.
Stolte, J: "Einbau and Proefung Von Federbelasteten Sicherheitsventilen" VBG Kraftwerkstechnik GmbH, vol. 73, No. 1 Jan. 1993, pp. 54-59.

* cited by examiner

*Primary Examiner*—Sujoy K Kundu
(74) *Attorney, Agent, or Firm*—Bliss McGlynn, P.C.

(57) ABSTRACT

A method of measuring the condition of a safety valve includes measuring a condition parameter that varies with the sealing force of the valve. The condition parameter may be determined from in-line measurements, such as measurements of a pressure pso at which the valve will open and a pressure psl at which the valve will leak.

25 Claims, 4 Drawing Sheets

SAFETY VALVE TESTING

The present invention relates to safety valves and in particular to the determination of the condition of a safety valve.

Force measurements carried out on spring operated safety valves can be used to determine the set pressures to which the safety valves have been adjusted. The tests typically consist of spindle lift force measurements on the valve spindles with the simultaneous observation of spindle and disc displacement and line pressure, and result in readings of the pressure at which a valve opens if a value is available for the effective sealing area. For safety valves in ideal condition this set pressure will also be the pressure at which the valve starts to leak. However, in practice, especially in metal-to-metal sealing safety valves, the pressure psl at which the valve starts to leak is always less than the pressure pso at which the valve opens. In good conditions the difference is small, but in general the difference is more significant. It is important to measure this difference as reliably as possible, because an excessive difference can impair the functioning of the safety valve. In particular, if the difference is large, the considerable extra spring load required to produce an adequate sealing force on a disc already in hard contact with the valve seat can limit the valve lift, when the valve is in operation, so that the discharge aperture becomes inadequate to provide sufficient pressure relief. The actual opening of the valve (in the absence of any mechanical impediment) will therefore be reached at a definitively higher pressure than intended. As the valve then closes, the greater the sealing force the further the system pressure has to fall to achieve a seal so the longer the valve will feather. This causes more wear and damage to the valve.

It is well known to use lift force measurements in safety valve in-line testing for the determination of set pressure. It is also known to calculate the effective sealing area of the valve from the measurement of lift forces at two different line or service pressures. However, the present invention makes use of the relationship between the pressure set-to-open pso and the pressure set-to-leak psl to measure the condition of the valve.

Accordingly the present invention provides a method of measuring the condition of a safety valve, the method comprising measuring a condition parameter that varies with the sealing force of the valve. This parameter may be the sealing force itself, or it may be any other suitable parameter. The method may include determining a valve opening parameter that varies with the pressure pso that will cause the valve to open. The valve opening parameter may be a lifting force that will cause the valve to open, or it may be pso itself.

The condition parameter may be related to, or arranged to vary with, the pso or to the psl of the valve, or to both, and may be related to, or arranged to vary with, the difference between psl and pso, or to the ratio of psl to pso. Whether the condition parameter increases or decreases with an increase in sealing force is not important, and whether there is a linear relationship or a non-linear relationship between them is also not important.

The method may include determining a leaking parameter that varies with the pressure psl that will cause the valve to leak. The leaking parameter may be a lifting force that will cause the valve to leak, or it may be psl itself.

The valve opening parameter or leaking parameter may be determined by measurement, or by being set to a predetermined value.

According to a further aspect of the invention, there is provided a method of determining the sealing force f of a safety valve, the safety valve comprising a valve closure member biased into contact with a valve seat, the method comprising the steps of:

measuring a first valve lift force F1 with a first fluid pressure pr1 acting on an inlet side of the valve closure member;

measuring a second valve lift force F2 with a second fluid pressure pr2 acting on the inlet side of the valve closure member; and calculating the sealing force f from the two valve lift force measurements.

Therefore in the present invention, force measurements can be brought to off-line test benches or test rigs in sequences of tests to measure the hitherto hidden sealing forces in safety valves, which determine their effectiveness in service.

The valve closure member may comprise a valve disc attached to a valve spindle and the valve lift force may be a valve spindle lift force.

These measurements may be used to determine an effective sealing area A of the valve using the known formula;

$$A = \frac{F1 - F2}{pr2 - pr1}$$

Before carrying out the valve lift force measurements, the valve may be adjusted to a desired pressure set-to-leak value psl. This is the pressure value at which the valve begins to leak and may be greater than either the first or second fluid pressure applied to the valve disc.

This effective sealing area may then be used to calculate the sealing force of the valve. The sealing force f is equal to the difference between a valve lift force, which could be either F1 or F2, and the force required to counterbalance the corresponding inlet fluid force, which could be A.(psl−pr1) or A.(psl−pr2) respectively. This may be expressed as:

$$f = F1 - A.(psl - pr1)$$

or;

$$f = F2 - A.(psl - pr2)$$

Substituting the effective sealing area A with the formula given above, these may also be expressed as:

$$f = F1 - \left(\frac{psl - pr1}{pr2 - pr1}\right)(F1 - F2)$$

or;

$$f = F2 - \left(\frac{psl - pr2}{pr2 - pr1}\right)(F1 - F2)$$

where $pr1 \leq pr2 \leq psl$.

If the pressure set-to-leak value psl has already been determined, these equations may be used to calculate the sealing force f from lift force measurements F1 and F2 at two different working pressures pr1 and pr2.

Preferably, one of the fluid pressures pr2 may be the expected operating pressure of the safety valve. In this case the corresponding force is referred to as a hot lifting force Fh. The first fluid pressure pr1 may be equal to the pressure on an outlet side of the valve closure member, which may be atmospheric pressure. Pressure readings are taken as gauge pressures and so in this case pr1=0 and the force is referred to as the cold lifting force Fc. The expression for the effective sealing area of the valve becomes:

$$A = \frac{Fc - Fh}{pr2}$$

and the sealing force f may be calculated using the formula;

$$f = Fc - \frac{psl}{pr2}(Fc - Fh)$$

where pr2≦psl.

The pressure at which the valve opens, the pressure set-to-open value pso, may also be calculated. This is the sum of the pressure at which the valve starts to leak psl and the pressure due to the sealing force f acting on an effective sealing area A. This may be expressed as:

$$pso = psl + \frac{f}{A}$$

The ratio f/Fc, where Fc is measured with a fluid pressure difference across the closure member of zero, may then be calculated to give an indication of the condition rating of the safety valve. The lower the ratio the better the quality of the valve.

If the 'cold' lift force Fc is not known and lift force measurements are taken at two different pressures pr1 and pr2, then the condition rating can be calculated using the ratio:

$$\frac{f}{(f + psl \cdot A)}$$

Alternatively, the condition rating may be calculated as a percentage using the formula:

$$\text{Condition Rating} = \frac{100f}{(f + psl \cdot A)} = \frac{100}{\left(1 + \frac{psl}{f} \cdot \left(\frac{Fh1 - Fh2}{pr2 - pr1}\right)\right)}$$

A current condition rating of the valve may also be calculated when the valve is installed. The current condition rating Qg may be determined using the formula:

$$Qg = \frac{fg}{fg + psl \cdot A}$$

where fg is a current sealing force.

This may also be expressed as:

$$Qg = 1 - \frac{psl}{pso}$$

where psl is the pressure set-to-leak and pso is the pressure set-to-open.

This enables the condition of the valve to be monitored while it is installed.

According to a further aspect of the invention, there is provided apparatus for determining the sealing force of a safety valve comprising a safety valve, a force sensor, a displacement sensor, a pressure sensor and means for applying a fluid pressure to a valve inlet.

Preferably, the force sensor is arranged to measure a valve lift force. The displacement sensor may measure to an accuracy of 10 μm.

The apparatus may further comprise an adjuster, which in use compresses a spring in the valve. This allows air pressure in the valve inlet to reach a predetermined pressure at which the valve begins to leak, known as pressure set-to-leak.

Preferably, the apparatus also comprises a control valve arranged to vent the valve inlet. This allows a valve spindle lift force to be measured with zero fluid pressure differential across the valve closure member.

The apparatus may further comprise a processor arranged to control the valve inlet pressure, record sensor readings and calculate a sealing force f. The processor may be arranged to record a force sensor reading when the displacement sensor first detects displacement of a valve closure member. This provides an automated testing system.

The apparatus may be arranged to calculate a condition rating of the valve, f/Fc, and to generate an output indicative of the condition rating. A display may also be provided, arranged to generate a display indicative of the condition rating.

The present invention further provides the use of the relationship between psl and pso as a measure of the state of quality of a safety valve.

Pso may be measured from an in-line test, such as a lift force test, or it may be measured in an off-line test.

The present invention still further provides use of a relationship between psl and pso, the latter being defined as the sum of a pressure at which the valve starts to leak psl and the pressure due to the sealing force f acting on an effective sealing area A, or from in-line determination of set pressure, for the measurement or characterisation of the state of quality of a safety valve.

The set-to-leak pressure may be determined from a valve lift force, or by any other suitable method.

The present invention further provides a method of measuring the condition of a safety valve, the method including the step of measuring the pressure pso at which the valve opens.

The method may further comprise providing a value of psl or any other parameter that that varies with psl and using that parameter or value with the measured pso to define a condition measure of the valve. The parameter that varies with psl may be measured when the valve is in-line, or when the valve is off-line.

The pso may be measured from a valve lift force test, such as a spindle lift test, i.e. by measuring a force required to open the valve, or by any other method, such as by measuring the fluid pressure that opens the valve.

The present invention further provides apparatus for measuring the quality of a safety valve comprising a force sensor, a displacement sensor, a pressure sensor and means for applying a fluid pressure to a valve inlet.

The apparatus may be arranged to carry out the method of the invention.

Preferred embodiments of the present invention will now be described by way of example only with reference to the accompanying drawings in which.

Figure 1:
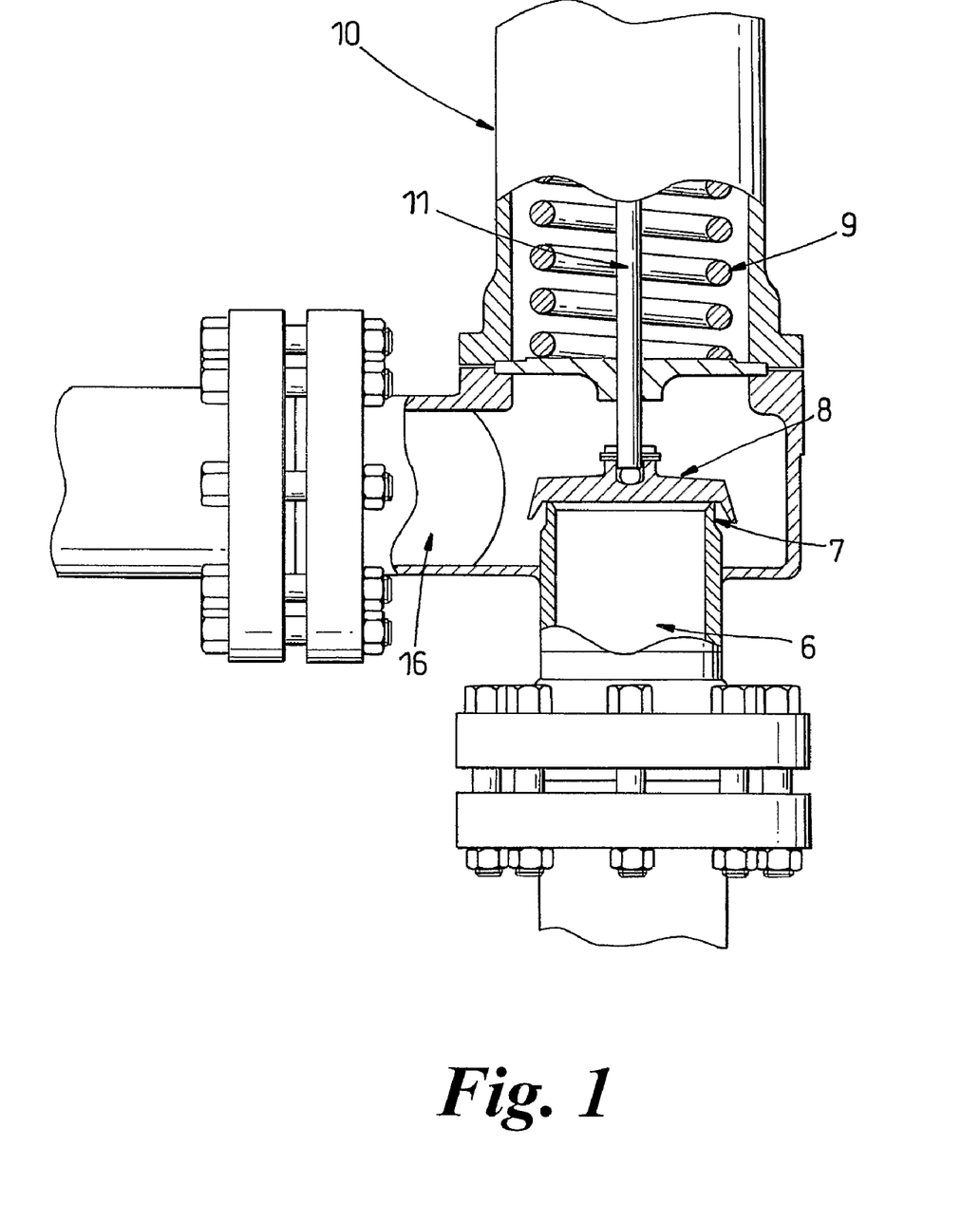
FIG. 1 is a section through a safety valve to which the present invention can be applied.

Referring to FIG. 1, a flanged pipe discharge safety valve 1, shown in service, comprises a valve inlet 6, valve outlet 16, and a valve seat 7 defining a valve aperture. A valve closure member in the form of a valve disc 8 is biased into contact with the valve seat 7 by a valve spring 9 and is mounted on the lower end of a valve spindle 11. The valve spindle 11 extends along the central axis of spring housing 10, which contains the valve spring 9. Under normal operation the valve remains closed with the disc 8 covering the aperture in the valve seat until the pressure in the inlet 6 is sufficient to lift the disc 8 off the valve seat 7. The biasing force of the spring 9 is adjusted so that the valve will open at a required set pressure.

The pressure pso at which the valve 1 will open is, as described above, higher than the pressure psl at which it will start to leak. The difference between these two pressures, multiplied by the effective area of the valve disk 8 against which the pressure acts, is referred to as the sealing force f of the valve. This gives the relationship:

$$Pso = psl + f/A \quad (1)$$

which can be re-written as:

$$f = A(pso - psl) \quad (2)$$

The sealing force can be measured in many ways, using a variety of parameters that vary with the sealing force. The relationship between the condition parameter and the sealing force is not important, provided a change in the sealing force will result in a change in the condition parameter. For example, a convenient measure Q can be defined as:

$$Q = 1 - psl/pso \quad (3)$$

Figure 2:
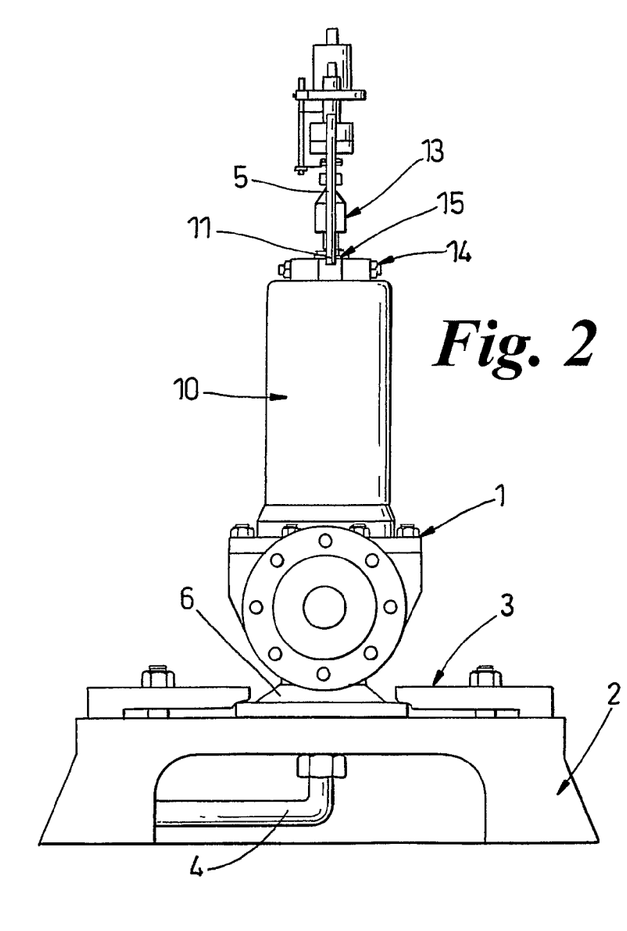
FIG. 2 shows a front view of the safety valve of FIG. 1 mounted on a test stand according to an embodiment of the invention.
Figure 3:
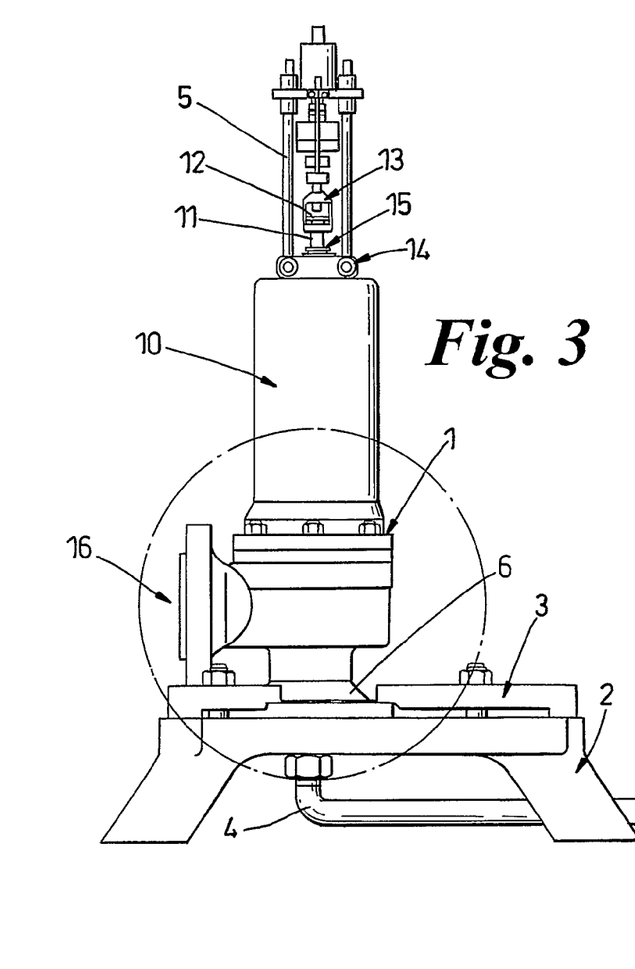
FIG. 3 shows a side view of the safety valve and test stand of FIG. 2 with the test structure in place.

Referring to FIGS. 2 and 3, in order to test the valve 1 in an off-line bench test according to a first embodiment of the invention, the valve inlet 6 is clamped by clamps 3 to a test stand 2, making an airtight connection and a compressed air pipe 4 is connected to the valve inlet 6 on the underside of the test stand 2. The compressed air pipe 4 is connected to a source of compressed air, the pressure of which can be monitored by a pressure sensor and controlled accordingly. This enables the inlet pressure to be controlled and measured.

A test structure 5 forms part of a spindle lift force measuring gear and replaces the valve cap and lifting lever that are in place when the valve 1 is in use. The top end of the safety valve spindle 11 protrudes from the spring housing 10 and its small end flange 12 is gripped by the jaw 13 of the test force mechanism. Clamps 14 secure the test structure 5 above the spring housing 10 and the top end of a screwed spring adjusting ferrule 15 is just visible above these clamps 14. It will, however, be appreciated that there are many styles of spindle top and coupling mechanism that may be used.

The measuring gear comprises a displacement sensor 18 arranged to measure any movement of the valve disc and a force transducer 20 measuring the lifting force applied to the valve disc 8. Together these enable the system to determine the force required to lift the valve disc 8 out of contact with the valve seat 7. The lifting force is provided by a hydraulic actuator 22.

The safety valve 1 is adjusted so that the valve starts to leak at a selected pressure. This means that once the pressure in the valve inlet 6 reaches the selected level, air will escape between the valve seat 7 and the valve disc 8. The valve disc displacement from its closed position at this stage is still substantially zero in that it is too small to be measured by the displacement sensor. When the safety valve 1 is mounted on the test bench 2, to set the pressure set-to-leak, compressed air from pipe 4 is admitted to the inlet 6 of the safety valve 1. A pressure sensor monitors the pressure in the inlet 6. The spring 9 is then compressed by the adjuster 15 until the valve leaks at the selected pressure psl. This leak point may be identified by listening or using pneumatic or electronic sensors at the outlet flange 16.

The valve inlet air supply 4 is then vented by means of a control valve (not shown) upstream of the test stand connection. The pressure difference across the valve i.e. the pressure difference between the valve inlet 6 and the outlet 16, which is at atmospheric pressure, is therefore zero. In this condition the lift force measuring gear 5 is activated and the first lifting force Fl, which in this case is the "cold" spindle lift force Fc is measured by the force transducer. This is the lift force without any pressure differential across the valve disc 8.

A second inlet pressure pr2 is then applied to the valve inlet 6, normally pneumatically, where pr2≦psl. This pressure pr2 is generally significantly below the set-to-leak pressure psl, for example, 15% to 25% lower. This second pressure pr2 may correspond to the usual operating pressure of the valve or reservoir pressure of the safety valve 1 when installed. With this second pressure still applied, a second lift force test is carried out on the spindle 11, yielding a second "hot" lift force value of Fh.

The two valve spindle lift force measurements Fc and Fh are then used to calculate the effective disc sealing area A and, together with the pressure set-to-leak psl, the sealing force f that exists between valve disc 8 and valve seat 7.

The sealing force f is the force that exists between the valve disc 8 and the valve seat 7 over and above the force required to counterbalance the fluid force at the leak point of the valve, which is given by A.psl. The sealing area A is the effective area of the valve disc 8 that is exposed to the inlet pressure when the valve is closed. The total spring force will therefore amount to (A.psl+f), which must equate to the first 'cold' lift force Fc measured when zero additional pressure is applied to the valve disc.

This can be expressed as:

$$Fc - f = A.psl \quad (4)$$

When a second pressure pr2 is applied to the valve disc 8, the force Fh required to lift the valve spindle 11 will be less than the force Fc required to lift the valve spindle 11 when no additional pressure is applied. This difference in force is given by A.pr2 and therefore, with this second inlet pressure pr2 applied to the valve disc 8, the second valve spindle lift force Fh can be expressed as:

$$Fh - f = A.(psl - pr2) \quad (5)$$

Subtracting equation (5) from equation (4) results in an expression for the effective disc seal area A, which is the area of a circle within the radial width of the top face of the valve seat 7:

$$A = \frac{Fc - Fh}{pr2} \quad (6)$$

Equation (6) may now be substituted in Equation (5) to yield a value for the sealing force f:

$$f = Fc - \frac{psl}{pr2}(Fc - Fh) \quad (7)$$

This expression gives a value for the required sealing force f in the safety valve at the pressure set-to-leak psl.

At some pressure in the valve inlet 6 above the pressure at which the valve 1 starts to leak, the valve disc 8 is raised, breaking contact between the valve disc 8 and the valve seat 7. The movement is detected by the displacement sensor in the test structure 5 and at this point the valve will have started to open. Plots of displacement against time and force against time are made and analysed so that the force at the point at which the valve opens can be determined. Displacement of the valve disc 8 is measured to an accuracy of 10 µm.

The pressure at which the valve opens, rather than just begins to leak, is given by the sum of the pressure at which the valve leaks psl and the pressure corresponding to the sealing force f. This pressure set-to-open pso can therefore be expressed as:

$$pso = psl + \frac{f}{A}. \quad (8)$$

This can be calculated by substituting sealing area A with the expression given by equation (6).

The percentage ratio 100 f/Fc %, i.e. the ratio of f to Fc, where Fc is the lifting force required to open the valve when pr1 is zero, can also be calculated from the values obtained. This ratio gives a measure of the quality of the safety valve: the lower the percentage, the better the quality. For example, a valve ratio of 100 f/Fc<5 signifies a valve in good condition, a valve ratio of 100 f/Fc<9 indicates a valve in satisfactory condition and a valve ratio of 100 f/Fc>25 indicates that the valve is not suitable for use. This value is known as the condition rating of the valve and will be affected by the state of the sealing surfaces, the freedom and alignment of the moving parts, the spring configuration, the cleanliness of the valve passages and corrosion among other factors.

From expressions (6) and (7) it follows that $$f = Fc - psl \cdot A \quad (9).$$

But the Condition Rating ratio is f/Fc. Hence $$f/Fc = 1 - \frac{psl \cdot A}{Fc}. \quad (10)$$

But further $$Fc/A = pso \quad (11)$$

as it should be, because the fluid pressure is such that it balances the entire spring force at the particular setting of the safety valve 1. It follows from (11) in (10) that $$f/Fc = 1 - psl/pso \quad (12).$$

Values for the effective sealing area A and the valve sealing force f can also be obtained from spindle lift force measurements at two different fluid pressures, where pr1 is greater than atmospheric pressure.

If the corresponding spindle lift forces are F1 (at pressure pr1) and F2 (at pressure pr2), then the effective sealing area A will be given by:

$$A = \frac{F1 - F2}{pr2 - pr1} \quad (13)$$

This expression, on its own, is known from in-line testing of safety valves to determine set pressure.

This expression for the effective sealing area can be substituted into a more general form of equations (4) and (5) to give the expressions:

$$f = F1 - \left(\frac{psl - pr1}{pr2 - pr1}\right)(F1 - F2) \quad (14)$$

and;

$$f = F2 - \left(\frac{psl - pr2}{pr2 - pr1}\right)(F1 - F2) \quad (15)$$

where pr1≦pr2≦psl.

These can then be used to calculate the sealing force from lift force measurements at two different fluid pressures.

If measurements at two different non-zero fluid pressures are used then a value for the 'cold' lift force Fc may not be known. The condition rating for the valve can then be calculated using the expression:

$$\text{Condition Rating} = \frac{100f}{(f + psl \cdot A)} = \frac{100}{\left(1 + \frac{psl}{f} \cdot \left(\frac{Fh1 - Fh2}{pr2 - pr1}\right)\right)} \quad (16)$$

A value for the sealing force f can be taken from either of equations (14) and (15) above.

It will be appreciated that, rather than the cold lifting force Fc, a related force such as the total spring force of the valve may be used. Under certain circumstances, these may be the same.

Figure 4:
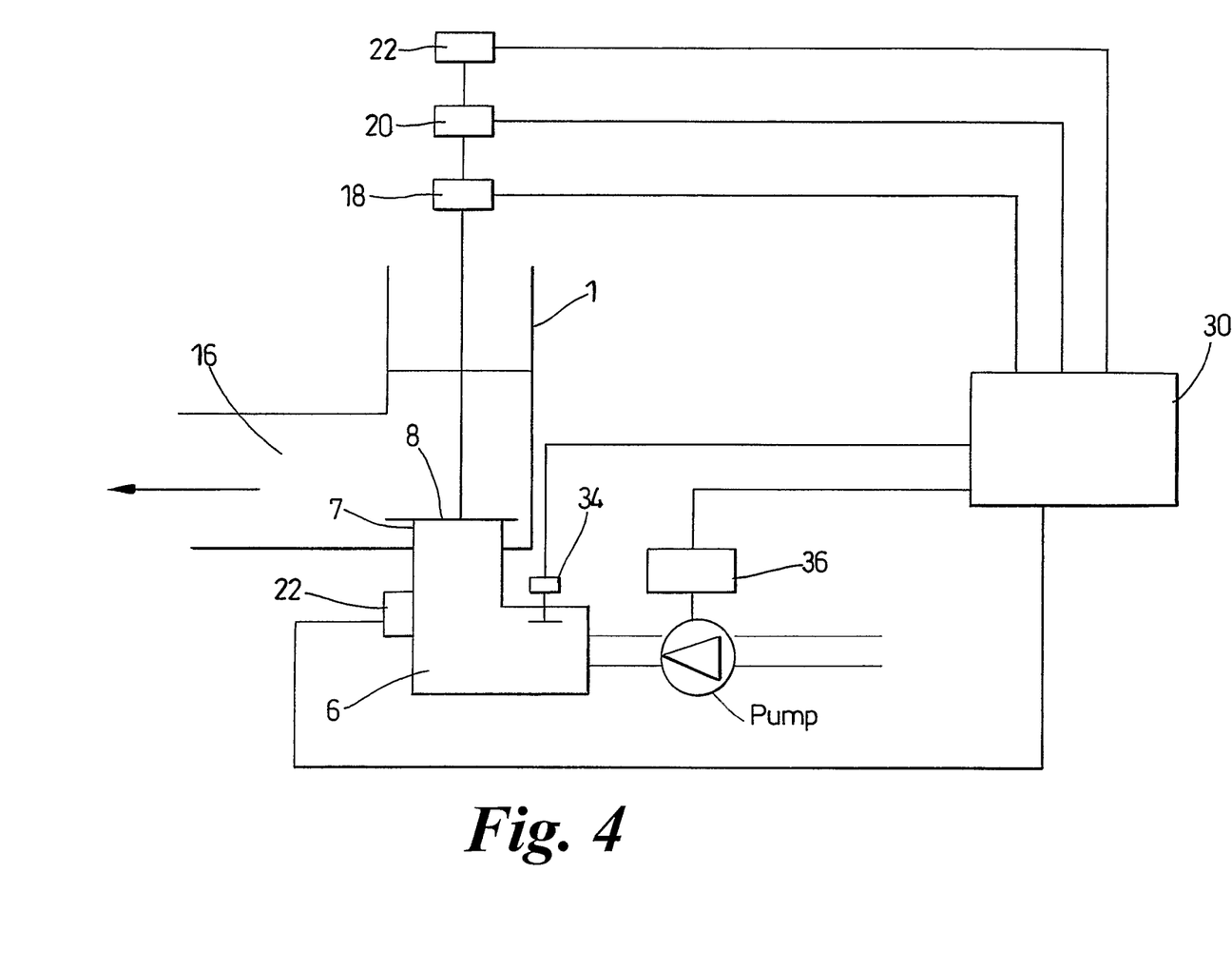
FIG. 4 is a schematic diagram of a valve and test apparatus according to a second embodiment of the invention.

The tests can be carried out manually. However, in a further embodiment of the invention, the test apparatus can run through an automated sequence to record measurements and calculate the results on a computer. Referring to FIG. 4, in this embodiment a controller 30 is connected to a pressure sensor 32 arranged to sense the valve inlet pressure, a pump motor 36, a displacement sensor 18 and a force sensor 20. A valve lifting actuator 22 is controlled by the controller 30 to apply a lifting force to the valve spindle and the force applied and resulting displacement of the valve disc are measured and monitored by the controller 30.

The controller 30 controls the supply of compressed air to the compressed air pipe and hence to the valve inlet. The pressure in the valve inlet is monitored by the pressure sensor 32 and fed back to the controller 30, enabling a controlled build up of pressure in the inlet valve to the required pressure. The displacement sensor 18 and the force sensor 20 form part of the test apparatus attached to the valve 1. The controller 30 controls the pump motor 36, vent valve 34 and valve lift actuator 30 to follow the test sequence described above. The displacement of the valve disc 8 and the force required to lift the valve disc are recorded and these measurements are fed back to the controller 30. In particular, the force measurement is recorded when a signal from the displacement sensor is first detected. Values for the effective sealing area A, sealing force f and pressure set-to-open are then calculated.

In an alternative embodiment, the hydraulic pressure in the valve lift actuator is controlled by manual pumping. The recorded displacement and force values are then used by the controller 30 to calculate the effective sealing area A, sealing force f and pressure set-to-open. This arrangement reduces the amount of power used by the system and enables the system to be used when no power supply is available.

In another embodiment the valve disc is displaced by a ram pushing from below instead of being lifted from above. This arrangement reduces the amount of space taken up by the test apparatus since the ram is moved by an actuator located within the test bench. Displacement of the valve disc is then measured using any suitable sensing device such as a laser beam displacement sensor which can be used to detect movement of the top end of the valve spindle.

It will be appreciated that the sealing force measurement can be carried out for a range of pressure set-to-leak values psl to give an overall view of the efficiency of the safety valve. Also, these values will vary according to the state of maintenance and wear of the valve, and can serve as a measure of any reconditioning work, which may have been carried out.

While in the embodiments described above, all of the tests are carried out off-line, it is possible in some circumstances for the tests to be carried out in-line with the valve being exposed to two or more different service pressures. This is particularly desirable where test results are required urgently or where it is not possible for the system to be kept inoperable for sufficient time for the off-line test to be carried out, and where the wait required for a suitable time when the system will be inoperative anyway, so-called 'outage', is too long. In other circumstances the safety valve is welded in-situ, so taking the valve out of the system to perform an off-line test may not be practical.

In-line monitoring of the condition rating can be used to monitor mechanical condition changes and can be particularly useful for revealing any mechanical deterioration of the valve. Monitoring of the condition rating before and after an overhaul also provides an objective assessment of the overhaul.

Therefore in a further embodiment, an off-line bench test is carried out before installation of the valve, which gives initial values for the effective sealing area A, the set-to-leak pressure psl and the initial condition rating Q, where Q=f/Fc. These values are all determined as described above, and then recorded on a certificate. A new or reconditioned valve can therefore be installed for service with certification showing these initial values.

Once the valve has been installed and in use for a period of time, an in-line 'hot' lift force Gh is measured at a pressure p2. This value, together with the known pre-installation values, is then used to calculate the set-to-open pressure pso, where $$pso = \frac{Gh}{A} + p2 \qquad (17)$$

and the current sealing force fg, where $$fg = Gh - (psl - p2)A \qquad (18)$$

The value for the current sealing force is used to calculate a current condition rating Qg, using the expression:

$$Qg = \frac{fg}{fg + psl \cdot A} \qquad (19)$$

Using equations (17) and (18), this can also be expressed as:

$$Qg = 1 - \frac{psl}{pso} \qquad (20)$$

The current condition rating Qg of the valve after a time in use can then be compared with the initial condition rating Q determined off-line before installation of the valve.

As with the other methods described above, this process can be carried out in an automated manner by the apparatus of FIG. 4.

Since the sealing force f is related to the difference between psl and pso, and therefore also related to the ratio of psl to pso, then it will be affected by a change in psl or a change in pso. The condition rating Q therefore generally increases if the sealing force f increases. Obviously, the condition rating could be arranged to decrease if the sealing force increases. Generally, however, the condition rating is arranged to vary if the sealing force varies.

In an ideal case, psl=pso and the condition rating Qg will be 0. Any mechanical deterioration of the valve will lead to an increase in the valve lifting force Gh and an increase in the set-to-open pressure pso, resulting in an increase in the current condition rating Qg. However an increase in Qg from the in-line monitoring only gives an indication of any mechanical deterioration, and this type of in-line test that relies on detecting valve opening and can only directly measure pso, does not measure any decrease in the psl value due to deterioration of the sealing surfaces. However, mechanical deterioration is likely to be accompanied by degradation of the sealing surfaces and these in-line tests can therefore give an indication of whether further off-line bench tests are required. For example, an increase in the set-to-open pressure pso measured in-line, resulting in a current condition rating Qg of approximately 9 or 10, indicates that further off-line tests are required. The deteriorated psl can then be determined off-line and the full increase in the condition rating Q calculated. After reconditioning of the valve, a new psl is measured and can also be recorded in a further certificate before reinstalling the valve. Ideally, a reconditioned valve should have a condition rating Q of not more than approximately 6.

As indicated above, in order to measure deterioration in valve condition accurately it is necessary to measure psl as well as pso. Although this generally not possible with displacement sensors, highly sensitive vibration sensors have now been developed that can detect the leak of gas through the valve from the vibration or noise that the leaking causes. Such sensors include acoustic sensors and ultrasound sensors arranged to detect vibration in, for example, air, or sensors arranged to detect vibration in a solid part of the system, especially near to the valve. These sensors have the advantage that they can detect the leak of gas through the valve when the valve is in-line, and they can therefore enable in-line measurement of psl as well as pso, and hence accurate measurement of valve condition in-line.

Figure 5:
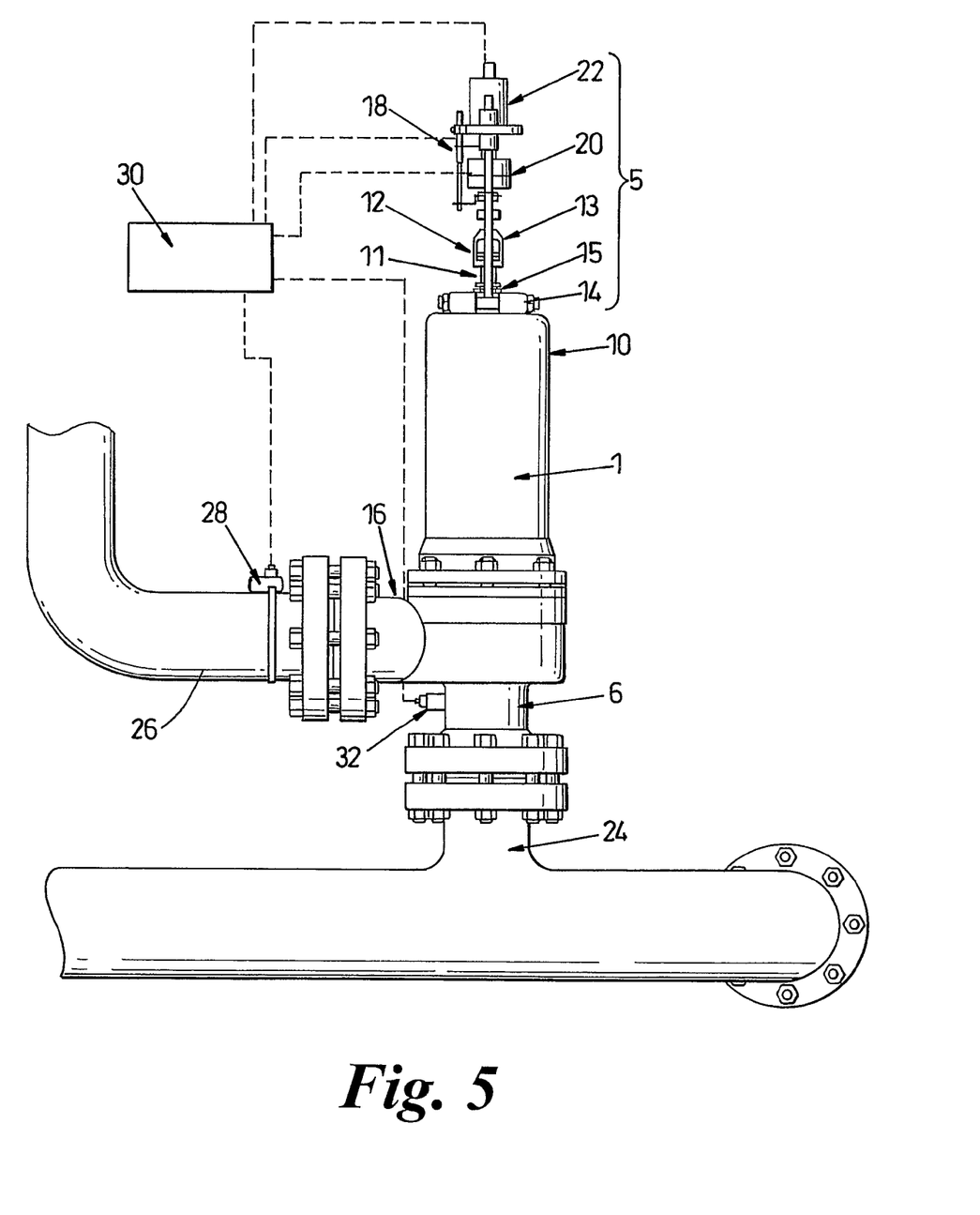
FIG. 5 shows a safety valve and test apparatus according to a further embodiment of the invention.

Referring to FIG. 5, in a further embodiment of the invention the valve 1 is connected in-line, and the test apparatus 5 is attached to the top of it as in FIGS. 1 and 2. The valve inlet 6 is coupled to an inlet pipe 24, which in turn is connected to the pressurised system that the safety valve is arranged to protect. The valve outlet 16 is coupled to an outlet pipe 26 through which gas can escape of the valve 1 opens. A vibration sensor 28 in the form of a transducer sensitive to acoustic vibrations is attached to the outlet pipe 26 close to the valve outlet 16. This is used as a fluid leakage sensor arranged to sense leakage of fluid through the valve. While the acoustic sensor is shown here attached to the outlet pipe, it may also be fixed to any part of the valve body, or indeed to any point of attendant pipe work.

A system controller 30 is arranged to receive signals from the vibration sensor 28, the displacement sensor 18 and the force transducer 20, and to control the operation of the actuator 22 that applies the lifting force to the valve. The system further comprises a pressure sensor 32 arranged to measure the gas fluid pressure at the valve inlet 6. In practice this sensor can be located at any convenient point in the pressurised system where it can measure the system pressure.

In this embodiment of the invention, the controller 30 is arranged to carry out the valve test in an automated manner. In order to carry out the test, the controller is arranged to increase the lifting force applied to the valve by the actuator 22 from zero. When the lifting force is zero, the valve will generally be fully closed, and no gas fluid will be escaping through it. This assumes that the system pressure pr is lower than psl. Obviously if this is not the case, then the valve will be leaking in service. As the lifting force increases, it will gradually start to overcome the force of the valve spring 9 that tends to keep the valve closed. When the net force on the disc 8 reaches a certain level, fluid gas will start to leak through the valve. This leaking of fluid gas will produce a noise, which is detected by the vibration sensor 28. The signal from the vibration sensor will generally change in a way that is easy to detect when the fluid starts to leak through the valve. The controller is arranged to analyse the signal from the vibration sensor 28 to determine when the leaking of gas first occurs, and to record the 'hot leak' lifting force Fhl that is applied to the valve disc at that point. This force is equal to the difference between the force produced by the pressure set-to-leak psl being applied to the valve sealing area, and the system pressure pr multiplied by the same valve sealing area. Therefore the controller 30 can determine psl from the measured values of Fhl and pr.

At the point when fluid starts to leak through the valve, the displacement of the valve disc is generally substantially zero, or at least very low. This is because it is still in contact with the valve seat when the leaking starts. There is no separation of the valve disc 8 from the valve seat 7, only a reduction in force with which the disc 8 is pressed against the seat 7. Therefore the leaking of fluid at this point cannot be detected by the displacement sensor 18. This is why a separate fluid leakage sensor, in this case the acoustic sensor, is needed to detect the point at which fluid leaks through the valve.

The controller 30 then continues to increase the lifting force and monitors and records the signals from the until the signal from the displacement transducer 18 and the force transducer 20. At some point the valve disc 8 will start to lift away from the valve seat 7. The sensor signals can then be analysed, for example by plotting displacement against lift force, to determine the 'hot open' lift force Fho that was being applied when indicates that the valve disc 8 was on the point of lifting away from the valve seat 7. This is the point at which the total upward force being applied to the valve disc 8 by the lifting mechanism and the fluid in the system, is equal to the downward force from the spring, and other factors. At this point the flow of fluid through the valve will be quite minimal, but will be distinct from the first leak referred to above, indicating that the valve has opened. Again the controller records the 'hot' lifting force Fho that is being applied at that point. This force is equal to the difference between the force produced by the pressure set-to-open pso being applied to the valve sealing area A, and the system pressure pr, at the time the test is carried out, multiplied by the same valve sealing area. Therefore the controller 30 can determine pso from the measured values of Fho and pr.

The controller 30 is then arranged to use the two recorded lifting forces, Fhl and Fho to calculate an indicator of the condition of the valve, in this case in the form of a condition rating for the valve indicative of the condition of the valve. In this case the condition rating is calculated using equation (2) above. However, it will be appreciated that other forms of indicator or condition rating could be used that give some measure of the sealing force f, or the difference between psl and pso. Indeed the system may be arranged simply to calculate the sealing force f.

The controller is also arranged to determine the sealing force f of the valve, which is the difference between the two forces Fhl and Fho, given by:

$$f = Fho - Fhl \tag{21}$$

This expression can be usefully developed further for the case where psl and pso are measured In-Line by means of first and second spindle lift force tests controlled by sonic/vibration sensor and high sensitivity spindle movement sensor respectively.

If in that case the first force is denoted Fhl and the second Fho, while the line pressure is p1, it will follow that $$psl = p1 + Fhl/A \tag{22}$$

and $$pso = p1 + Fho/A \tag{23}$$

where clearly Fhl≦Fho. Inserting (22) and (23) into (21), and simplifying:

$$f/Fc = Q = \frac{Fho - Fhl}{Fho + A \cdot p1}. \tag{24}$$

Q stands here for the Condition Rating of the safety valve. It is seen that the effective seal area A appears in the expression, and unless it can be measured by, say, an additional cold lift test (at zero fluid pressure), it has to be found from manufacturer's information or other data.

However it should be noted that this formula for calculating the condition rating is reasonably insensitive to errors in the value of A. This is because typically the term A.p1 is only about two thirds or three quarters of the value of the total denominator Fho+A.p1. Therefore this formula enables the condition to be measured quite accurately even if the effective sealing area A is not known very accurately.

If it is possible to carry out a cold test, the denominator becomes the total spring force Fc, and the Condition Rating can be written $$Q = \frac{Fho - Fhl}{Fc}. \quad (25)$$

To derive values of psl and pso from the forces Fhl and Fho, the controller 30 needs to use a value of the valve sealing area A. This may be a value that is measured when the valve is manufactured and that is input into the controller. Alternatively it can be determined from the mean of measured outside and inside seat diameters of the valve seat 17. However, in this embodiment it is determined by measurement. The controller 30 is arranged, when the system is at zero pressure, to measure a 'cold' lifting force Fc, which is the force required to open the valve at zero system pressure. This is measured in the same way as the 'hot' lifting force Fho described above. This measurement, together with the 'hot' lifting force Fho and the system pressure pr at which the hot lifting force is measured, can then be used to calculate a value for the valve sealing area, using the equation:

$$A = (Fc - Fho)/pr \quad (26)$$

This is the most comprehensive way of determining the seat area, because it is entirely measured with the valve mounted in-line.

This method of measuring the condition of the valve has the advantage, particularly in in-line measurements, that both psl and pso can be measured from a single lift stroke, making it quick and efficient.

It will be appreciated that this the method of determining sealing area can, be generalized to measuring the lifting force at any two system pressures pr1 and pr2, where pr1≦pr2 with respective 'hot' lifting forces Fho1 and Fho2. The system pressures pr1 and pr2 are recorded together with associated 'hot' lifting forces, and the sealing area is then given by the equation:

$$A = (Fho1 - Fho2)/(pr2 - pr1) \quad (27)$$

Although in the embodiment described above, the test is carried out in an automated way, it is equally possible for the test to be controlled manually. For example, the force provided by the actuator 22 may be increased manually. In some cases the actuator may be omitted and the lifting force varied manually, for example using screw-threaded lifting mechanism. Similarly, the output from the vibration sensor 28 may be in form of an amplified acoustic output, so that a human operator can listen for the noise produced when the valve starts to leak. The displacement sensor output can also be monitored by the human operator, to determine when the valve has opened. Finally the measurements of Fhl and Fho can be recorded manually.

It will be appreciated that the order in which Fhl and Fho are measured is not critical. While it is efficient to measure both in a single stroke of the lifting mechanism, Fho could be measured before Fhl, and the measurements can be made in separate tests.

In a further embodiment of the invention, while the system pressure pr is above zero, the force applied to the valve disc 8 by the valve spring 9 is adjusted until the valve starts to leak. This is achieved using the adjusting ferrule 15. Valve leak can be detected using an amplified acoustic output from the vibration sensor 28. This effectively makes the set-to-leak pressure psl equal to the system pressure. The lifting force applied by the valve lift mechanism 5 is then increased until the valve is detected as having opened. This lifting force Fho is then a direct measurement of the valve sealing force f. A value of psl is then recorded as being the system pressure, and the value of pso is provided by equation (1). The condition rating can then be determined, for example using equation (3).

In a further embodiment, the condition of the valve can be monitored without the need to measure the accurate sealing area of a safety valve, because an adequate value is available from manufacturer's data, or available workshop physical measurement. Therefore in this embodiment, the pressure set-to-leak and pressure set-to open are measured, and checked to ensure that the sealing force f is not too high, or does not exceed a predetermined limit, by ensuring that a chosen pressure set-to-leak psl does not diverge excessively, or by more than a predetermined amount, from the pressure set-to-open pso. This is done in a off-line situation by setting the psl of the safety valve to a required value by spring adjustment to an audible hiss, or instrumental first leak detection.

The instrumentation could use sonic or ultrasonic sensing at or near the valve body, thermal flow detection at the open outlet of the valve, or vibration sensing at or near the valve. Then the total spring force on the valve disc is measured by a single cold test to give Fc.

From the assumed or known sealing area A, pso can be determined using the equation:

$$pso = Fc/A \quad (28).$$

The limit by which psl will be allowed to differ from pso can then be chosen, say at 5%. If this limit is exceeded, the valve is worked by lapping, fettling and reconditioning until the 5% limit is achieved. It will be appreciated that the exact parameters that are measured are again not significant, but for example, the difference between psl and pso is being used as the condition parameter in this method.

Depending on the system that the valve is arranged to protect, the fluid may be gas, or a mixture of gas and liquid, or in some cases just liquid.

The invention claimed is:

1. A method of measuring the condition of a valve, the valve comprising a valve seat, a valve spring, and a closure member having an inlet side and biased by the spring into contact with the seat, the method comprising:
    determining a first pressure which when applied to the inlet side of the closure member of the valve will cause the valve to start to open;
    determining a second pressure, lower that the first pressure, which when applied to the inlet side of the closure member of the valve will cause the valve to start to leak with approximately zero displacement of the closure member;
    defining a condition parameter that varies with the difference between the first and second pressures; and
    determining a value of the condition parameter thereby to determine the condition of the valve.

2. A method according to claim 1 wherein the condition parameter is related to the sealing force f which is the force that exists between the closure member and the seat in excess of the force required to counterbalance the fluid force on the closure member at the leak point of the valve, and is defined by f=(pso-psl)A where pso is the pressure required to cause the valve to open, psl is the pressure required to cause the valve to leak and A is the effective valve sealing area.

3. A method according to claim 2 wherein the first pressure is determined from a lifting force that will cause the valve to open.

4. A method according to claim 1 wherein the second pressure is determined from a lifting force that will cause the valve to leak.

5. A method according to claim 1 wherein at least one of the first and second pressures is determined by measurement.

6. A method according to claim 1 wherein at least one of the first and second pressures is determined by being set.

7. A method according to claim 1 including applying a lifting force to a closure member of the valve thereby to cause fluid to leak through the valve, and measuring a leak-producing lifting force at which the leaking occurs.

8. A method according to claim 4 wherein leaking is sensed at least partially by a vibration sensor arranged to sense vibration caused by the leaking of fluid.

9. A method according to claim 1 including applying a lifting force to the closure member thereby to cause the valve to open, and measuring a valve-opening lifting force at which the valve opens.

10. A method according to claim 1 wherein the valve closure member has an inlet side, the method comprising the steps of:
   measuring a first valve lift force F1 with a first fluid pressure pr1 acting on the inlet side of the valve closure member;
   measuring a second valve lift force F2 with a second fluid pressure pr2 acting on the inlet side of the valve closure member; and
   calculating the condition parameter from the two valve lift force measurements.

11. A method of measuring the condition of a valve, the valve comprising a valve seat, a valve spring, and a closure member having an inlet side and biased by the spring into contact with the seat, the method comprising:
   determining a first pressure which when applied to the inlet side of the closure member of the valve will cause the valve to start to open;
   determining a second pressure, lower that the first pressure, which when applied to the inlet side of the closure member of the valve will cause the valve to start to leak with approximately zero displacement of the closure member;
   defining a condition parameter that varies with the difference between the first and second pressures;
   determining a value of the condition parameter thereby to determine the condition of the valve;
   measuring a first valve lift force F1 with a first fluid pressure pr1 acting on the inlet side of the valve closure member;
   measuring a second valve lift force F2 with a second fluid pressure pr2 acting on the inlet side of the valve closure member;
   calculating the condition parameter from the two valve lift force measurements; and
   determining an effective sealing area A of the valve using the ratio of the difference between the first and second fluid pressures and the resulting difference between the first and second valve lift force.

12. A method according to claim 11 wherein the sealing area is determined using the formula:

$$A = \frac{F1 - F2}{pr2 - pr1}.$$

13. A method according to claim 1, comprising the step of adjusting the valve to a desired pressure set-to-leak value psl.

14. A method of measuring the condition of a valve, the valve comprising a valve seat, a valve spring, and a closure member biased by the spring into contact with the seat, the method comprising:
   determining a first pressure at which the closure member of the valve will start to open;
   determining a second pressure, lower that the first pressure, at which the valve will start to leak with approximately zero displacement of the closure member;
   defining a condition parameter that varies with the difference between the first and second pressures;
   determining a value of the condition parameter thereby to determine the condition of the valve;
   wherein the condition parameter is related to the sealing force f which is the force that exists between the closure member and the seat of the valve in excess of the force required to counterbalance the fluid force on the closure member at the leak point of the valve, and is defined by f=(pso-psl)A where pso is the pressure required to cause the valve to open, psl is the pressure required to cause the valve to leak and A is the effective valve sealing area; and
   wherein the sealing force f is calculated using the formula:

$$f = F1 - \left(\frac{psl - pr1}{pr2 - pr1}\right)(F1 - F2)$$

or;

$$f = F2 - \left(\frac{psl - pr2}{pr2 - pr1}\right)(F1 - F2)$$

where pr1≦pr2≦psl.

15. A method according to claim 14, wherein the first fluid pressure pr1 is equal to a fluid pressure acting on an outlet side of the valve closure member.

16. A method according to claim 15, wherein pr1=0 and the effective sealing area A of the valve is determined using the formula:

$$A = \frac{F1 - F2}{pr2}.$$

17. A method according to claim 15 wherein the step of calculating the sealing force f uses the formula:

$$f = F1 - \frac{psl}{pr2}(F1 - F2)$$

where pr2≦psl and where psl is the pressure set-to-leak.

18. A method according to claim 2, wherein the condition parameter of the valve is calculated using the ratio:

$$\frac{f}{(f + psl \cdot A)}$$

where psl is the pressure set-to-leak.

19. A method according to claim 2, wherein the condition parameter of the valve is calculated using the ratio:

$$\frac{1}{\left(1 + \frac{psl}{f} \cdot \left(\frac{Fh1 - Fh2}{pr2 - pr1}\right)\right)}$$

where psl is the pressure set-to-leak.

20. A method according to claim 1 wherein the condition parameter of the valve is the ratio of the sealing force f to a cold lifting force Fc and is calculated using the ratio:

$$\frac{f}{Fc}.$$

21. A method according to claim 1, wherein at least one step of the method is carried out when the valve is installed in-line.

22. A method according to claim 21, wherein the condition parameter is a current condition rating Qg is determined using the formula:

$$Qg = \frac{fg}{fg + psl \cdot A}$$

where fg is a current sealing force.

23. A method according to claim 21, wherein the condition parameter is a current condition rating Qg determined using the formula:

$$Qg = 1 - \frac{psl}{pso}$$

where psl is the pressure set-to-leak and pso is the pressure set-to-open.

24. A method according to claim 21 wherein the condition parameter is a condition rating Q determined using the formula:

$$Q = \frac{Fho - Fhl}{Fho + A \cdot pl}.$$

25. Apparatus for determining the sealing force of a valve comprising a valve seat, a valve spring, and a closure member having an inlet side and biased by the spring into contact with the seat, the apparatus comprising, a force sensor, a displacement sensor, a pressure sensor and a mechanism for applying a fluid pressure to a valve inlet, and a controller arranged to control the valve inlet pressure, record readings from the sensors, and calculate a condition parameter that varies with the sealing force of the valve wherein the sealing force f is the force that exists between the inlet side of the closure member and the seat in excess of the force required to counterbalance the fluid force on the inlet side of the closure member at the leak point of the valve, and is defined is defined by f=(pso-psl)A and pso is the pressure required to cause the valve to open, psl is the pressure required to cause the valve to leak and A is the effective valve sealing area.

* * * * *